(12) United States Patent
Dickson et al.

(10) Patent No.: US 6,216,384 B1
(45) Date of Patent: Apr. 17, 2001

(54) INSECT BAIT STATION

(75) Inventors: Dane Dickson, Pleasanton; Stephen M. Costa, Stockton; Ezra A. Theys, San Mateo, all of CA (US)

(73) Assignee: The Clorox Company, Oakland, CA (US)

( * ) Notice: Subject to any disclaimer, the term of this patent is extended or adjusted under 35 U.S.C. 154(b) by 0 days.

(21) Appl. No.: 08/434,519

(22) Filed: May 4, 1995

(51) Int. Cl.[7] ................................................. A01M 1/20
(52) U.S. Cl. ................................... 43/131; 43/132.1
(58) Field of Search .................... 43/131, 132.1, 43/112, 121

(56) References Cited

U.S. PATENT DOCUMENTS

| | | | |
|---|---|---|---|
| D. 273,032 | 3/1984 | Woodruff | D22/122 |
| D. 275,875 | 10/1984 | Woodruff | D22/122 |
| D. 278,842 | 5/1985 | Woodruff | D22/119 |
| D. 298,160 | 10/1988 | Gatarz | D22/122 |
| D. 306,197 | 2/1990 | Demarest et al. | D22/122 |
| D. 323,871 | 2/1992 | Nitta | D22/122 |
| D. 326,702 | 6/1992 | Demarest | D22/119 |
| D. 326,890 | 6/1992 | Mares | D22/119 |
| D. 329,681 | 9/1992 | Demarest et al. | D22/122 |
| 885,536 * | 4/1908 | Shimer | 43/121 |
| 1,569,170 * | 1/1926 | Braun et al. | 43/121 |
| 1,797,743 * | 3/1931 | Wesson | 43/121 |
| 1,887,771 * | 11/1932 | Marsh | 43/121 |
| 2,234,500 * | 3/1941 | Moore | 43/131 |
| 2,710,485 | 6/1955 | Starr | 43/131 |
| 3,488,879 * | 1/1970 | Laughlin | 43/131 |
| 4,030,233 * | 6/1977 | Wunsche | 43/121 |
| 4,173,093 * | 11/1979 | Nakai | 43/121 |
| 4,263,740 * | 4/1981 | Hemsarth et al. | 43/121 |
| 4,316,344 * | 2/1982 | Carlsen | 43/121 |
| 4,423,564 * | 1/1984 | Davies et al. | 43/121 |
| 4,485,582 * | 12/1984 | Morris | 43/131 |
| 4,563,836 | 1/1986 | Woodruff et al. | 43/131 |
| 4,761,912 | 8/1988 | Dyer et al. | 43/121 |
| 4,823,506 | 4/1989 | Demarest | 43/131 |
| 4,837,969 | 6/1989 | Demarest | 43/131 |
| 4,894,947 | 1/1990 | Brandli | 43/131 |
| 5,033,229 * | 7/1991 | Demarest et al. | 43/131 |
| 5,040,327 | 8/1991 | Stack et al. | 43/131 |
| 5,048,225 | 9/1991 | Brandli | 43/131 |
| 5,090,153 | 2/1992 | Mullen et al. | 43/114 |
| 5,237,774 * | 8/1993 | Warner | 43/131 |
| 5,357,709 | 10/1994 | Lin | 43/131 |
| 5,490,349 * | 2/1996 | Muramatsu | 43/121 |
| 5,548,922 * | 8/1996 | Wefler | 43/131 |

FOREIGN PATENT DOCUMENTS

| 13531 * | 5/1895 | (GB) | 43/121 |
|---|---|---|---|

* cited by examiner

Primary Examiner—Darren W. Ark
(74) Attorney, Agent, or Firm—Thomas C. Feix; Harry A. Pacini

(57) ABSTRACT

A spill resistant insect bait station having a continuous outer wall leading from the base or bottom surface up to an upper annular surface having a central axial recessed opening therein leading down to a bait source contained in the interior of the station, the interior of the station having an inverted conical concave part shape, so as to provide for flooding or concentration of the bait to the lowest point of the cone or concave part which communicates in close proximity with an opening in the bottom of the central axial recessed opening in which the insect can climb the outer wall to enter the station to retrieve the bait and then exit the station carrying bait back to the insect habitat.

12 Claims, 4 Drawing Sheets

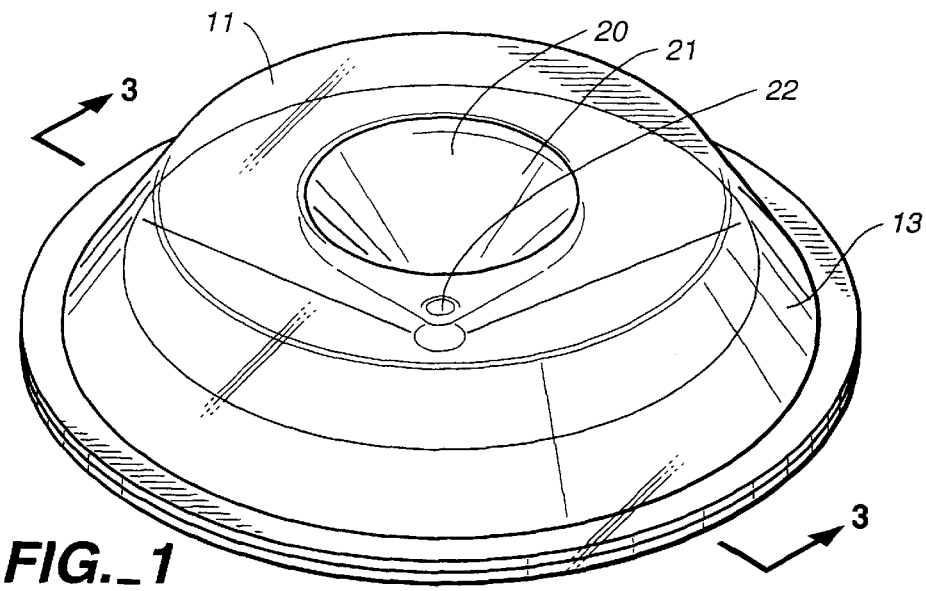
FIG._1
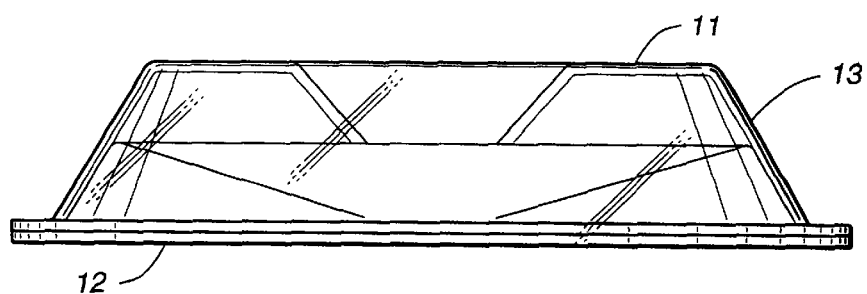
FIG._2
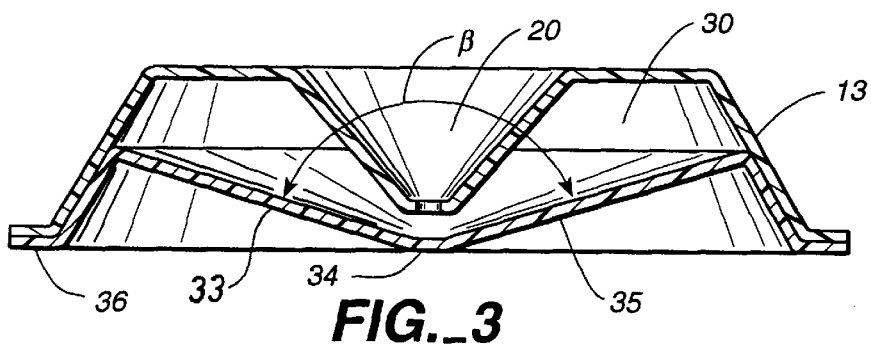
FIG._3
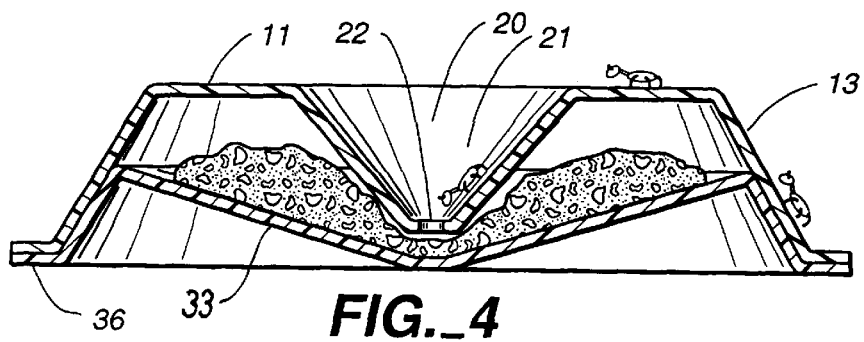
FIG._4

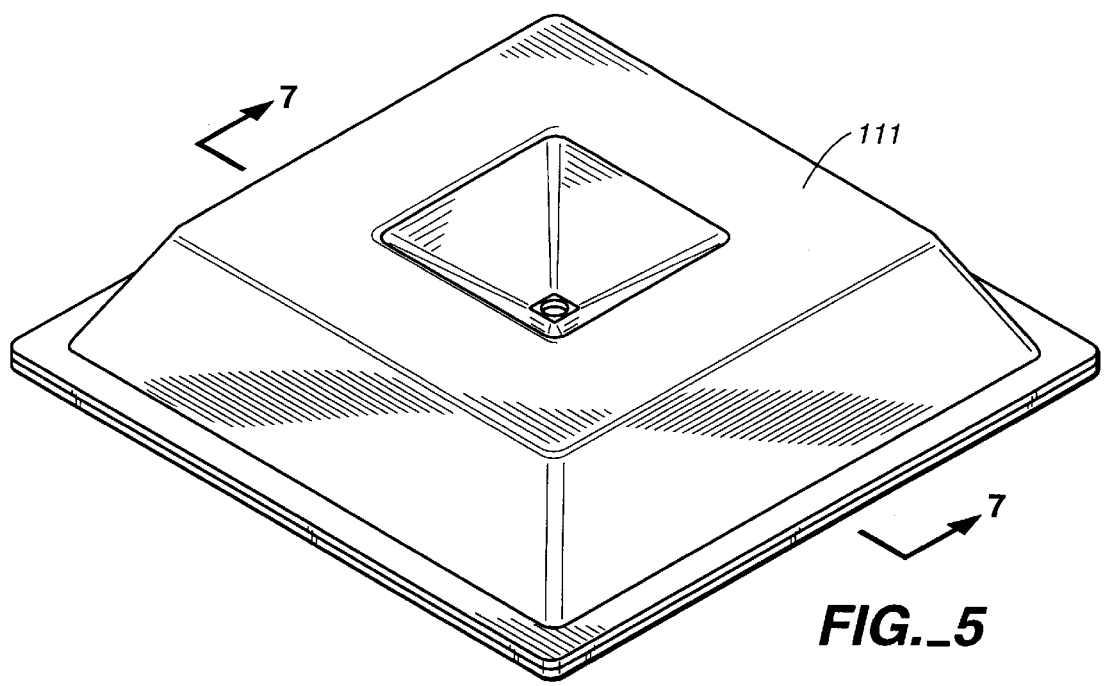
FIG._5
FIG._6
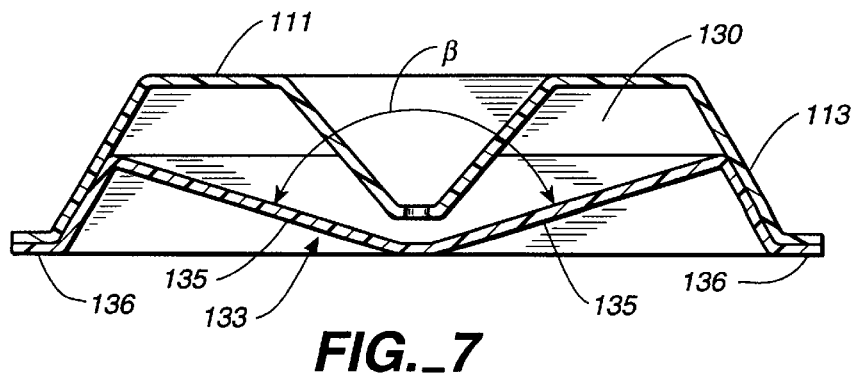
FIG._7

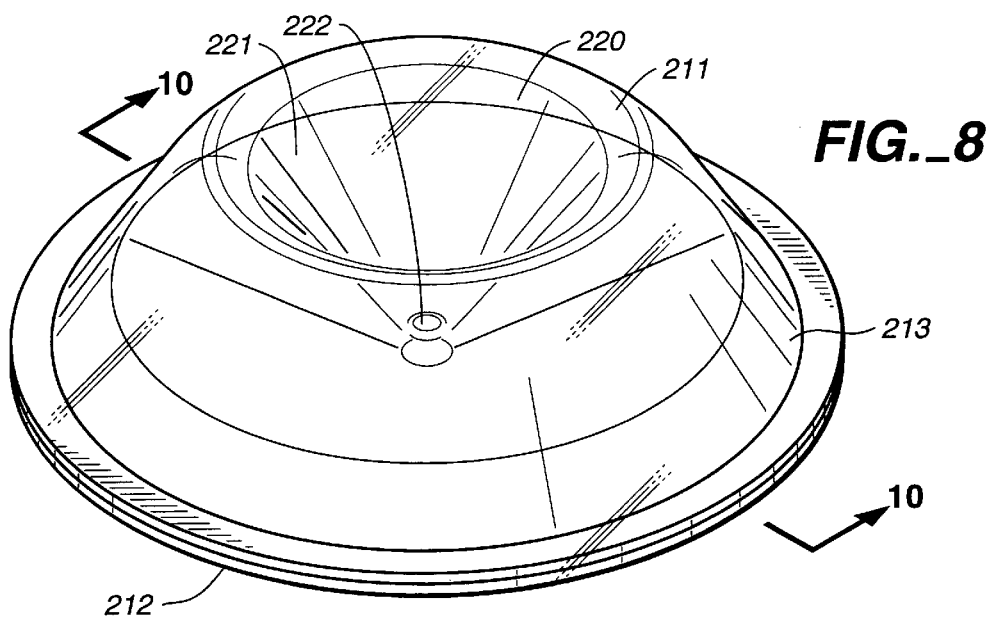
FIG._8
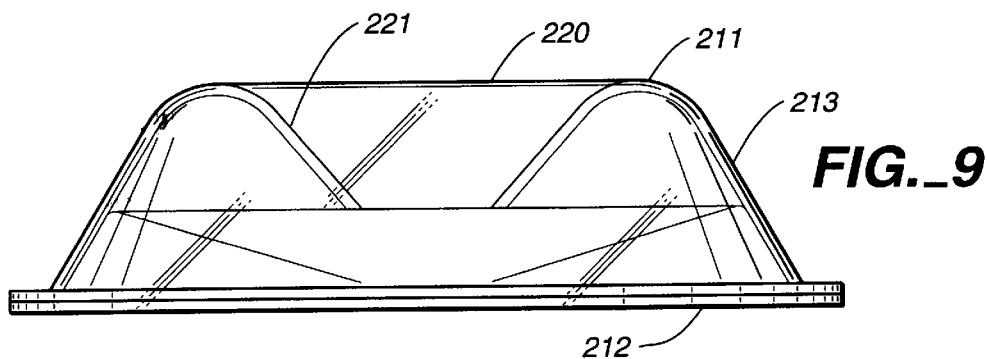
FIG._9
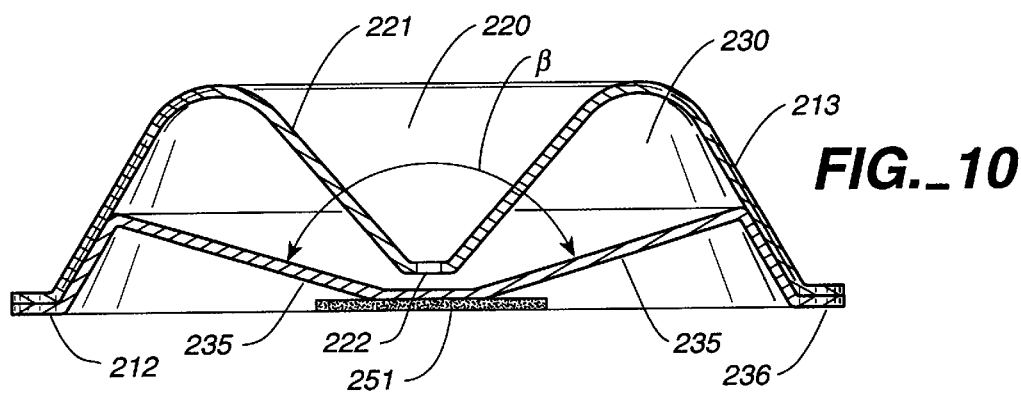
FIG._10

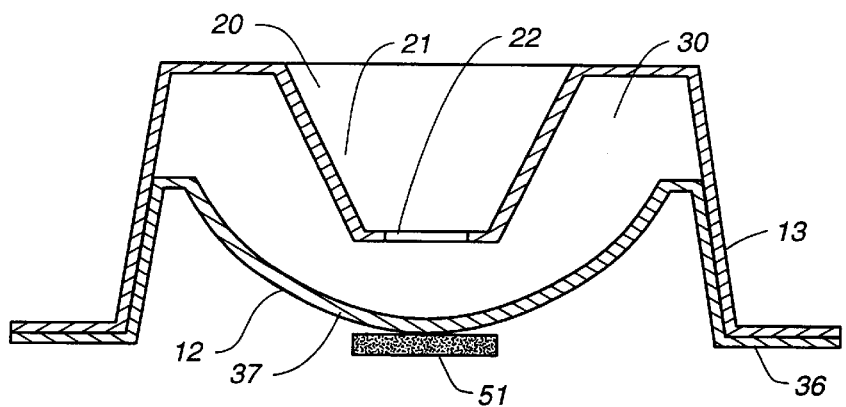
FIG._11
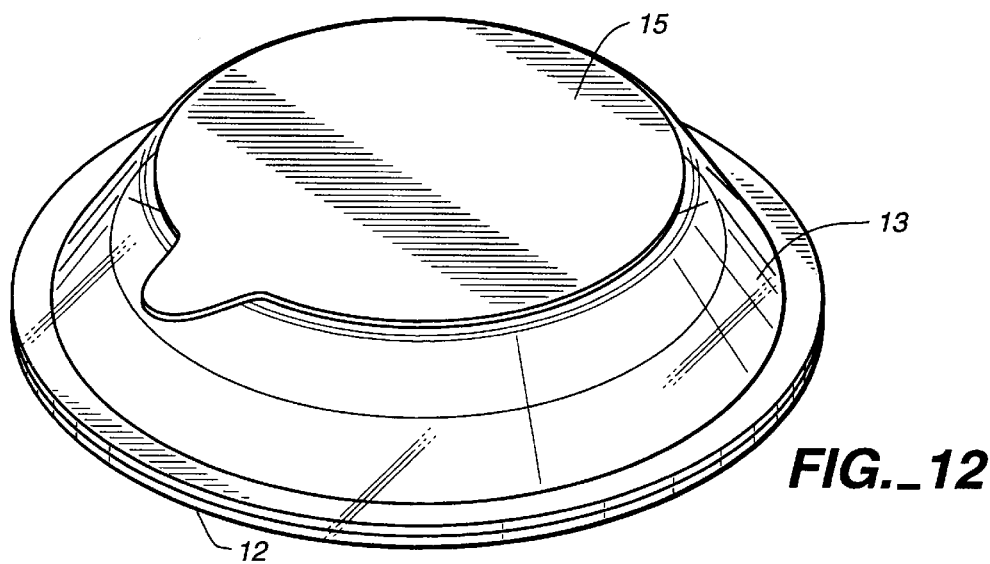
FIG._12
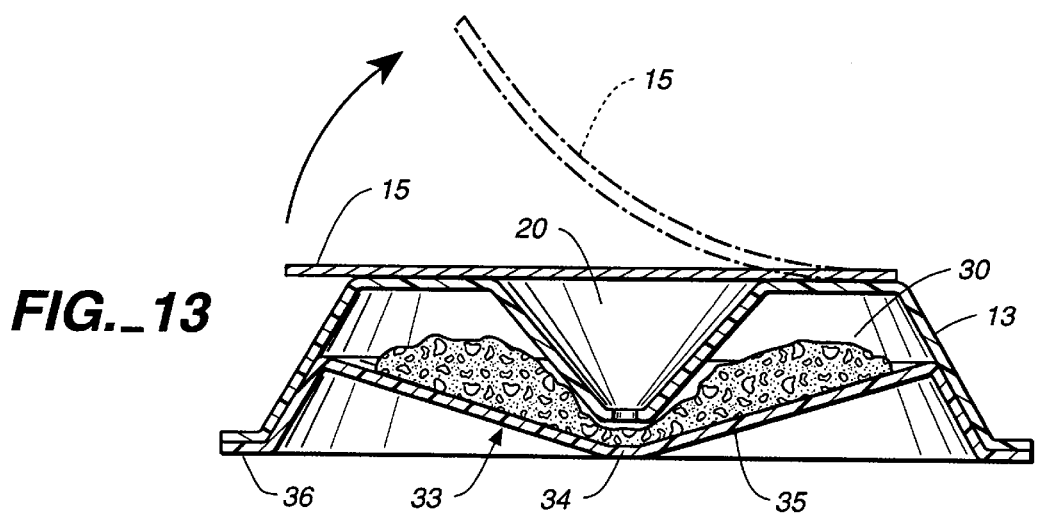
FIG._13

INSECT BAIT STATION

BACKGROUND OF THE INVENTION

This invention relates to a device for destroying insects. It more particularly relates to an insect bait station whereby poison may be administered to insects and whereby insects will remove poison containing material from the station and carry the material back to the insect habitat for feeding of other insects thereby killing other insects. This is done with a spill resistant station configuration minimizing the danger to children or domestic animals. The station of this invention has means for guiding said insects to the poison containing bait.

Various types of devices have been known in the prior art for destroying insects. In some devices, the insects are trapped in the device after entering, either by mechanical construction, or by sticking to a gummy substance. In either instance, such prior art device is soon full and useless. In devices which contain a poison, either it was easy to shake out loose poison, or probe through openings to reach the poison, thus making them a danger to children or small domestic animals. In addition, prior devices are generally of a construction that the interior of the device is difficult to view so that it is not readily ascertainable whether insects are using the device or how much poison has been used.

U.S. Pat. No. 4,173,093 relates to a catching device for cockroaches. This device is a trap as opposed to the bait station of the present invention. The insect moves across the supporting surface beneath the device and between the lower surface of the floor portion of the device. This permits the cockroach to enter the central axial opening into the device housing. The cockroach is lead through a passage way into the central portion of the device trapping the insect. U.S. Pat. No. 4,263,740 relates to a crawling insect trap wherein the device is designed so that either upon exiting or entering the center opening of the annular flange to retrieve food the insect will fall back into the trap.

Other bait stations in the prior art are of the type wherein a series of guides and baffle means guide the crawling insect through openings in the periphery of the station to the central point area, for example, U.S. Pat. No. 4,563,836. Such stations must contain bait which is not granular. The bait therein is preferably of a paste-like solid "cookie" consistency.

It is therefore an object of this invention to provide an insect bait station which is attractive to the feeding insect.

It is therefore an object of this invention to provide an insect bait station which is substantially spill resistant and attractive to the feeding insect.

A further object is to provide an insect feeding station which is not dangerous to children or pets.

A further object is to provide an insect feeding station in which it is readily possible to detect the use of the poison bait.

Another object is to provide an insect bait station with means for guiding insects toward the poison-containing bait and to carry said bait away from the station back to the insects' nest.

These and other objects of the invention will become apparent as the description thereon proceeds. The objects of this invention may be attained and the disadvantages of the prior art trapping devices are overcome by the use of the present invention. The device of the present invention has a base portion for carrying a poison bait and a cover. The bait station comprises a cover, a continuous outer sidewall, a base or bottom surface and has an opening in the cover for insect access to the bait in the base portion. In the preferred embodiment, the cover is annular and has a continuous outer side wall and a central axial opening for insect access to the bait. In another embodiment, the opening in the cover may be off-center. The outer case may be of any configuration, e.g., round, oval, square, rectangular, or hexagonal and the like.

The poison is preferably formulated in a composition of the type known as bait, i.e., it is a mixture of poison in admixture with a food material attractive to the target insects, such as, but not limited to, flour, molasses, peanut butter, citrus pulp, animal fats such as lard and tallow, with an organic filler such as bran, and crushed puffed grain, pregel defatted corn cob grits or a starch matrix are also useful. The bait is preferably granular or paste-like. Other additives can be added to the formulation of the bait, for example, dry pupa of silkworm, various animal digestive parts, such as freeze dried poultry liver, and the like.

It is preferable to formulate ant baits with a matrix material. The ideal matrix material for the bait for use in the instant bait station would be one that can be picked up by the foraging insect and carried back to the nest to be passed around to other insects. Contact insecticides would not generally be suitable, unless a slow-acting contact poison were used, since the bait material as used in this invention would best be useful for killing foragers. Sulfimide, hydramethylnon, and avermectin are examples of suitable insecticides. Preferably, the insecticide constitutes 0.2–10% by weight of the bait.

The instant bait station is particularly useful for supplying bait to insects. The insect baits of this invention are especially effective for the control of ants, such as, but not limited to, the southern fire ant [Solenopsis xyloni], leaf cutting ants [Acromyrmex versicolor], Argentine ants [Iridomyrmex humilis], cornfield ants [Lasius alienus, pavement ants [Teiramorium caespitum], larger yellow ants [Acanothomyops interjectus], thief ants [Solenopsis molesta], and the red and black imported fire ants [Solenopsis invicta] and [Solenopsis saevissma richteri], respectively. These ants are serious economic pests which have been known to attack human beings, livestock, and agronomic crops. Therefore, it is highly desirable to control them. Other ants that can be controlled are nuisance pests such as Pharaoh ants [Monomorium pharaohnis], odorous house ants [Tapinoma sessile], and acrobat ants [Crematogaster cerasi].

The base may be formed as a unitary piece from a deformable material, such as a plastic, by known methods. One method for forming the base is from a flat sheet of plastic which is either thermoformed or vacuum formed over a suitably designed mold to form inverted conical portions which act as a receiving area for the bait. It is also possible to form the base by injection molding of a molten plastic into a suitably designed mold. The cover of the device is also formed in like manner as a unitary piece which is attached to the top of the device. The cover is permanently affixed to the top of the device. The cover is permanently affixed to the base and, optionally has at least a part which is transparent so that the poison is visible through the cover.

The insect bait station of the present invention can be made of paper, wax, plastic, or metal, provided the sloping inclines and declines are of a particular material to allow the insect, particularly ants, to efficiently walk thereupon to access the poison containing bait in the interior of the station and to exit the station and return to the nest. Although any of the enumerated materials will suffice, moldable plastic, such as polystyrene, would be preferred.

In one embodiment of the present invention, the cover which is affixed to the base has a least a section thereof which is transparent so that the poison is visible therethrough. Alternatively, the entire cover may be transparent. In this latter embodiment, it may be desirable to color the floor of the compartment with a contrasting color before filling the bait station, and more desirably the contrasting color may be luminous so that it is readily visible in darkened areas. As bait is removed by insects, the contrasting color underneath becomes visible and provides an indication whether insects are using the station and how much bait has been used.

SUMMARY OF THE INVENTION

The insect bait station of the present invention obviates deficiencies of prior art station traps for ants and other crawling insects by providing a bait station having a continuous outer wall leading from the base or bottom surface up to an upper surface having a recessed opening therein leading down to a bait source contained in the interior of the station. The interior of the station having a concave receptacle such as an inverted conical or bowl shape so as to facilitate flooding or concentration of the bait to the point of the cone or bowl which communicates in close proximity with an opening or orifice in the bottom of the central axial recessed opening. Further provided that the insect can climb the outer wall to enter the station to retrieve the bait and then turn around to exit the station carrying bait back to the insect habitat. Preferably, the bait station is frustroconical-shaped with an annular upper surface with a centra axial recessed opening therein to cover the bait in the interior of the station.

DESCRIPTION OF THE DRAWINGS

As seen in the drawings:

FIG. 1 is a perspective view of an insect bait station according to the present invention;

FIG. 2 is a side elevational view of an insect bait station according to the present invention;

FIG. 3 is a side elevational view in section taken along line 3—3 of FIG. 1;

FIG. 4 is the bait station of FIG. 3 with a typical crawling insect, such as an ant, entering the bait station with bait present;

FIG. 5 is a perspective view of a second embodiment of the invention;

FIG. 6 is a side elevational view of said second embodiment;

FIG. 7 is a side elevational view in section taken along lines 7—7 of FIG. 5;

FIG. 8 is a perspective view of a third embodiment of the invention;

FIG. 9 is a side elevational view of the third embodiment;

FIG. 10 is a side-elevational view in section taken along lines 10—10 of FIG. 8;

FIG. 11 is a cross sectional view of a bait station having a concave bowl bait receptacle in the base and an adhesive pad;

FIG. 12 is a perspective view of a bait station of this invention with a cover placed over the central axial recessed opening; and FIG. 13 is a cross-sectional view of the bait station of FIG. 3 with a cover in place over the central axial recessed opening and in open position.

DETAILED DESCRIPTION OF THE INVENTION

The invention will further be described with further reference to the drawings, wherein the same number in the various Figures has identical meaning. Shown in FIGS. 1–4 is a crawling insect bait station comprising an upper annular surface 11, a bottom surface 12, and continuous sidewall 13 in the general configuration of a frustrum or truncated pyramid. Although the sidewall 13 is shown inclined upwardly at approximately 45° angle, this angle is arbitrary. The general overall configuration can be modified so that instead of being truncated, the pyramid can be a truncated cone or ovaloid or other desired shape. Extending downwardly from the central axial opening 20 is an inwardly inclined wall 21 which extends in an inwardly and downwardly inclined direction to a smaller opening or orifice 22 in the bottom of the inverted axial recessed opening, as an inverted cone. The opening 22 leads into the interior of the bait station 30.

At the bottom of the central axial recessed opening 20 is an opening or orifice 22 leading into the bait source in the interior of the bait station 30. The opening 22 is large enough to allow the insect to enter the interior of the bait station 30 and to allow the crawling insect to retrieve bait, such as granular bait, and exit from the opening 22 and ascend the incline 21 and exit the opening 20, leaving the bait station. Therefore, it is preferred that the opening 22 is no larger than necessary to permit the free passage of the target insect into and out of the opening. The restricted size of opening 22 makes the station substantially spill resistant.

The interior of the bait station 30 contains an inverted conical portion of concave receptacle 33 having an interior flooding angle B of from about 50° to about 145°, preferably from about 65° to about 145°, more preferably from about 65° to about 90°. The angle of the inverted cone 33 is critical to allow the bait to self-flood or to become concentrated at the lower point of the cone or bowl 34 which cooperates in close dimensional proximity with the opening 22 at the bottom of the inclined wall 21. The inverted cone 33 or concave bowl portion 37 in FIG. 11 in the interior of the bait station is a reservoir for the bait. In order for the bait to be readily available to the entering insect at the opening 22 it is necessary for the bait to be concentrated at the point of the inverted cone adjacent to the opening 22. The necessary interior angle β formed by the sides of the inverted cone will depend upon the nature of the bait. If the bait is a loose free-flowing granule the interior angle β may be greater. If, however, the bait is a viscous paste or gel then the angle must be substantially steeper, i.e., the interior angle β may be less, to maintain the flow of the bait material to the point 34 of the inverted cone 33 or bowl 37.

The embodiments of FIGS. 1 through 10 are used by positioning food or other suitable bait containing insecticide beneath the central axial opening 20 after positioning the device in a location frequented by the insects. In shipment or movement of the device, the central axial opening 20 is sealed or covered by suitable seal means. For example, a removable adhesive cover or adhesive cover with a plug extending into the central axial opening 20 to cooperate with the central axial opening 20 and thereby seal the opening. The natural inclination of the insect, especially ants, is to climb upwardly over the sidewall 13 to the annular surface 11 and then downwardly along the inclined wall 21 in the central axial opening 20 and through the opening 22 into the interior of the bait station 30. After the insect has found the bait and selected a piece to carry back to the nest, the insect then departs through the opening 22, ascends the inclined wall 21, crosses the annular surface 11 and descends the sidewall 13. The upper annular surface 11 is represented in FIGS. 1 through 4 as flat, however, a curved or raised annular surface, such as a toroidal surface, is acceptable. FIG. 4 includes representation of an adhesive pad 51 affixed to the bottom surface 12. Said pad 51 can be used to removably position the bait station in a temporary location.

FIGS. 5 through 7 and 8 through 10 illustrate a second and third embodiment, respectively, of the invention which is generally of rectangular or toroidal configuration as opposed to the planar circular configuration of the embodiment represented by FIGS. 1 through 4. These embodiments are the functional equivalent of the corresponding members of FIGS. 1–4, but are identified by adding a "1" and "2" to the reference numbers, e.g., "130", "131", "230", "231", etc. In either embodiment, the interior of the bait station is an inverted conical portion 33 or bowl-shaped wherein the point 34 of the conical portion is placed in close proximity to the opening 22 of the central axial opening 21 leading from the exterior of the bait station. The inverted conical portion 33 in the interior of the bait station has upwardly inclined diverging wall portion 35 to the proximity of the continuous outer sidewall of the annular cover. The bottom surface is preferably molded in one portion to include the inverted conical portion 33 and a base peripheral flange 36 which cooperates with the outer sidewall flange of the annular cover to form a region whereby the two portions may be permanently affixed, as by adhesive, sonic welding, or any other suitable means.

It will be seen that each of the above-described embodiments are similar to each other. Consequently, it will be seen that each provides a unique yet effective device for presenting bait to insects, especially ants, from a non-spillable container wherein granular bait, as well as, gels or pastes may be used. Numerous modifications of the preferred embodiments and features disclosed herein will undoubtedly occur to those of skill in the art and it should be understood that the spirit and scope of the invention is to be limited solely by the appended claims.

What is claimed is:

1. An insect bait station comprising:
    an upper annular surface, a central opening in the bottom of the annular surface, having a downwardly positioned continuous wall leading to a central axial recessed opening, an upwardly positioned continuous outer sidewall, a bottom surface peripherally affixed to the outer sidewall and an interior portion;
    said downwardly positioned continuous wall leading from the upper annular surface to said interior portion of said station through said central axial recessed opening;
    said downwardly positioned wall and said outer sidewall being coterminous with the upper annular surface;
    said downwardly positioned continuous wall leading to said central opening in the bottom thereof in communication with the interior of the bait station; and
    a bottom surface having a modified concave receptacle holding bait, wherein said bait is a granular bait.

2. The insect bait station according to claim 1 wherein said concave receptacle is an inverted conical shape.

3. The insect bait station according to claim 2 wherein said concave receptacle is an inverted conical shape having an interior flooding angle of from about 50° to about 145°.

4. The insect bait station according to claim 2 wherein said concave receptacle is an inverted conical shape having an interior flooding angle of from about 65° to about 125°.

5. The insect bait station according to claim 2 wherein said concave receptacle is an inverted conical shape having an interior flooding angle of from about 65° to about 90°.

6. The insect bait station according to claim 1 wherein said concave receptacle is a bowl shape.

7. An insect bait station comprising:
    an upper annular surface, a central opening in the bottom of the annular surface, having a downwardly positioned continuous wall leading to a central axial recessed opening, an upwardly positioned continuous outer sidewall, a bottom surface peripherally affixed to the outer sidewall and an interior portion;
    said downwardly positioned continuous wall leading from the upper annular surface to said interior portion of said station through said central axial recessed opening;
    said downwardly positioned wall and said outer sidewall being coterminous with the upper annular surface;
    said downwardly positioned continuous wall leading to said central opening in the bottom thereof in communication with the interior of the bait station; and
    a bottom surface having a modified concave receptacle holding bait, wherein said bait is a paste bait.

8. The insect bait station according to claim 7 wherein said concave receptacle is an inverted conical shape.

9. The insect bait station according to claim 8 wherein said concave receptacle is an inverted conical shape having an interior flooding angle of from about 50° to 145°.

10. The insect bait station according to claim 8 wherein said concave receptacle is an inverted conical shape having an interior flooding angle of from about 65° to about 125°.

11. The insect bait station according to claim 8 wherein said concave receptacle is an inverted conical shape having an interior flooding angle of from about 65° to about 90°.

12. The insect bait station according to claim 7 wherein said concave receptacle is a bowl shape.

* * * * *